(12) United States Patent
Pataki

(10) Patent No.: US 7,717,128 B2
(45) Date of Patent: May 18, 2010

(54) PRESSURE BALANCED THREE-WAY VALVE FOR MOTION CONTROL

(76) Inventor: Arpad Matyas Pataki, 7080 N. 400 W., Columbus, IN (US) 47201

( * ) Notice: Subject to any disclaimer, the term of this patent is extended or adjusted under 35 U.S.C. 154(b) by 753 days.

(21) Appl. No.: 11/555,308

(22) Filed: Nov. 1, 2006

(65) Prior Publication Data
US 2007/0131289 A1 Jun. 14, 2007

Related U.S. Application Data

(60) Provisional application No. 60/734,161, filed on Nov. 7, 2005.

(51) Int. Cl.
*F16K 31/06* (2006.01)
(52) U.S. Cl. ............... 137/596.17; 137/596.1
(58) Field of Classification Search ............. 137/596.1, 137/596.17, 627.5, 625.25, 625.26, 625.27, 137/596.2; 251/77
See application file for complete search history.

(56) References Cited

U.S. PATENT DOCUMENTS

| | | | |
|---|---|---|---|
| 2,404,514 A | 7/1946 | McClure | |
| 2,902,052 A * | 9/1959 | Ohlsson | 137/625.64 |
| 2,912,009 A * | 11/1959 | Cooksley | 137/625.65 |
| 2,948,298 A * | 8/1960 | Gardner | 137/270.5 |
| 3,538,954 A * | 11/1970 | Fagerrlie et al. | 137/625.65 |
| 3,628,571 A | 12/1971 | Ostwald et al. | |
| 3,823,736 A | 7/1974 | Vanti | |
| 3,921,666 A | 11/1975 | Leiber | |
| 3,970,111 A | 7/1976 | Brune et al. | |
| 4,281,682 A | 8/1981 | Satoh | |
| 4,304,258 A | 12/1981 | Mitchell | |
| 4,567,914 A * | 2/1986 | Coppola et al. | 137/625.64 |
| 5,115,722 A | 5/1992 | Ichihashi et al. | |
| 5,248,191 A | 9/1993 | Kondo et al. | |
| 5,375,506 A | 12/1994 | Hashida et al. | |
| 5,550,631 A | 8/1996 | Shapanus et al. | |
| 5,567,023 A | 10/1996 | Yoo | |
| 5,771,933 A * | 6/1998 | Akamatsu et al. | 137/627.5 |
| 5,927,334 A | 7/1999 | Ishigaki | |
| 2003/0127140 A1* | 7/2003 | Warlick | 137/533.11 |

* cited by examiner

*Primary Examiner*—Stephen Hepperle
*Assistant Examiner*—Craig M Schneider
(74) *Attorney, Agent, or Firm*—Michael D. Beck; Maginot, Moore & Beck LLP

(57) ABSTRACT

A switching control valve for use in controlling the motion of a hydraulic component is provided. The valve includes a housing that defines a feed port, an outlet port, a drain port, and a longitudinal opening through the housing. The valve also includes an inlet valve moveably positionable in the longitudinal opening for selectively fluidly connecting the feed port to the outlet port, as well as a drain valve moveably positionable in the longitudinal opening for selectively fluidly connecting the outlet port to the drain port. The valve further includes a valve shaft that is moveably positionable in the longitudinal opening, such as by a solenoid or similar control device, and is operably connected to the inlet valve and the drain valve. The housing, the inlet valve and/or the drain valve are configured to provide permanent fluid communication between the outlet port and the drain port.

16 Claims, 5 Drawing Sheets

1. DEENERGIZED
Engine Valve Closed

2. ENERGIZED
"High Level"
Engine Valve is Opening

3. ENERGIZED
"Medium Level"
End of Opening. Fill from Drain

4. ENERGIZED
"Medium Level"
Engine Valve Stays Open

5. DEENERGIZED
Engine Valve is Closing

6. ENERGIZED
"Medium Level"
Engine Valve Slows Down

7. DEENERGIZED
Engine Valve Closed

PRESSURE BALANCED THREE-WAY VALVE FOR MOTION CONTROL

CROSS-REFERENCE TO RELATED APPLICATIONS

This Application is a utility patent application claiming priority to U.S. Provisional Patent Application, Ser. No. 60/726,564 filed Nov. 9, 2005, entitled PRESSURE BALANCED THREE-WAY VALVE FOR MOTION CONTROL. The disclosure of this provisional application No. 60/726,564 is hereby incorporated by reference in its entirety

BACKGROUND

The present invention relates to a switching control valve that controls the operation of hydraulic motion systems.

Such hydraulic systems are found in anti-lock braking systems, directional actuators and valve control systems of internal combustion engines. There is an ever-present demand for greater flexibility in the control of such systems.

SUMMARY OF THE INVENTION

In view of the above-identified problems and limitations of the prior art and alternate hydraulically operated devices, the present invention provides a single solenoid, pressure-balanced, three-stage, three-way valve for controlling the stroke, or the activating force of hydraulically operated devices.

In one embodiment of the present invention, a switching control valve for use in controlling the motion of a hydraulic component is provided. The valve includes a housing. The housing defines a feed port, an outlet port, a drain port, and a longitudinal opening. The valve also includes an inlet valve moveably positionable in the longitudinal opening of the housing for selectively fluidly connecting the feed port to the outlet port. The valve also includes a drain valve moveably positionable in the longitudinal opening of the housing for selectively fluidly connecting the outlet port to the drain cavity though the drain port. The valve also includes a valve shaft moveably positionable in the longitudinal opening of the housing and operably connected to the inlet valve and the drain valve. The valve also includes a solenoid operably connected to the valve shaft for moveably positioning the valve shaft in the longitudinal opening. The housing is configured to provide permanent fluid communication between the outlet port and the drain port.

In another embodiment of the present invention, a device for use in controlling the motion of an intake or exhaust valve in an internal combustion engine is provided. The device includes a housing. The housing defines a feed port, an outlet port, a drain port, and a longitudinal opening in the housing. The device also includes an inlet valve moveably positionable in the longitudinal opening of the housing for selectively fluidly connecting the feed port to the outlet port. The device also includes a drain valve moveably positionable in the longitudinal opening of the housing for selectively fluidly connecting the outlet port to the drain. The device also includes a valve shaft moveably positionable in the longitudinal opening of the housing and operably connected to the inlet valve and the drain valve. The device also includes a solenoid operably connected to the valve shaft for moveably positioning the valve shaft in the longitudinal opening. The housing is configured to provide permanent fluid communication between the outlet port and the drain port.

In yet another embodiment of the present invention, a method for controlling the motion of an intake or exhaust valve including, but not limited to, an intake or exhaust valve in an internal combustion engine is provided. The method includes the steps of providing a housing with a longitudinal opening and providing an inlet valve. The method also includes the steps of moveably positioning the inlet valve in the longitudinal opening of the housing and selectively fluidly connecting the feed port to the outlet port. The method further includes the steps of providing a drain valve and moveably positioning the drain valve in the longitudinal opening of the housing. The method includes the steps of fluidly connecting the outlet port to the drain cavity and providing a valve shaft. The method includes the steps of moveably positioning the valve shaft in the longitudinal opening of the housing, operably connecting the valve shaft to the inlet valve and the drain valve, and providing a solenoid. The method includes the steps of operably connecting the solenoid to the valve shaft and moveably positioning the valve shaft in the longitudinal opening.

BRIEF DESCRIPTION OF THE DRAWINGS

Features of the present invention will become apparent to those skilled in the art from the following description with reference to the drawings, in which:

FIGS. 1a-1g are cross-sectional and enlarged cross-sectional views along the longitudinal axis of a three-way valve according to an embodiment of the invention;

DESCRIPTION OF THE PREFERRED EMBODIMENTS

Figure 1A:
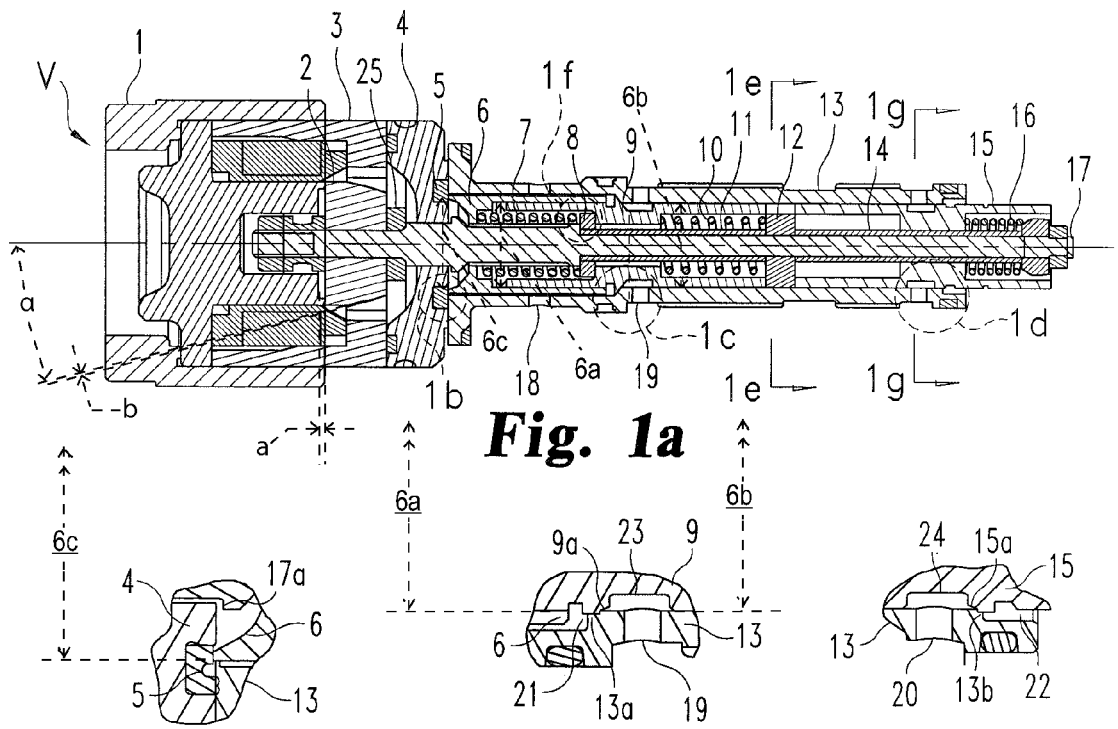

For the purposes of promoting an understanding of the principles of the invention, reference will now be made to the embodiments illustrated in the drawings and described in the following written specification. It is understood that no limitation to the scope of the invention is thereby intended. It is further understood that the present invention includes any alterations and modifications to the illustrated embodiments and includes further applications of the principles of the invention as would normally occur to one skilled in the art to which this invention pertains.

In an embodiment of the invention, a valve V shown in FIG. 1 includes a solenoid stator 3 which may be de-energized or energized at two different current levels. A valve housing 13 houses two pressure balanced valves—an inlet valve 9 and a drain valve 15. The valves may be poppet valves. The inlet valve 9 is pressure balanced in both its open and its closed positions, and in any intermediate position, regardless of pressures in the outside cavity 21 or in the annulus 23 behind the inlet valve seat 13a (see FIG. 1c). To achieve this pressure balancing feature, a floating sleeve 6 is used which has an inner diameter 6a that is the same as the bore diameter 6b, and which is also the same as the sealing diameter at the contact between the inlet valve's sealing surface 9a and the valve seat 13a. To improve the sealing at the end surface of the floating sleeve 6 and to avoid excessive side load due to manufacturing inaccuracies, a specially formed elastic or elastomeric seal 5 is located at the left end of the sleeve, as shown in the detail of FIG. 1b. The sealing force of the floating sleeve 6 on the seal 5 can be controlled by adjusting the contact diameter 6c of the sleeve relative to its outer diameter, the wall thickness of the sleeve at the contact surface, the high (inlet) pressure of the fluid within the valve V and the spring force exerted by the inlet spring 7.

Figure 2:
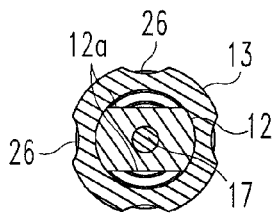
FIG. 2 is a cross-sectional view of the valve of FIG. 1 integrated into the head of a hydraulic device.
Figure 2:
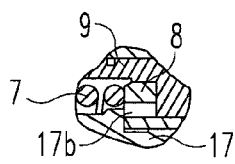
Figure 2:
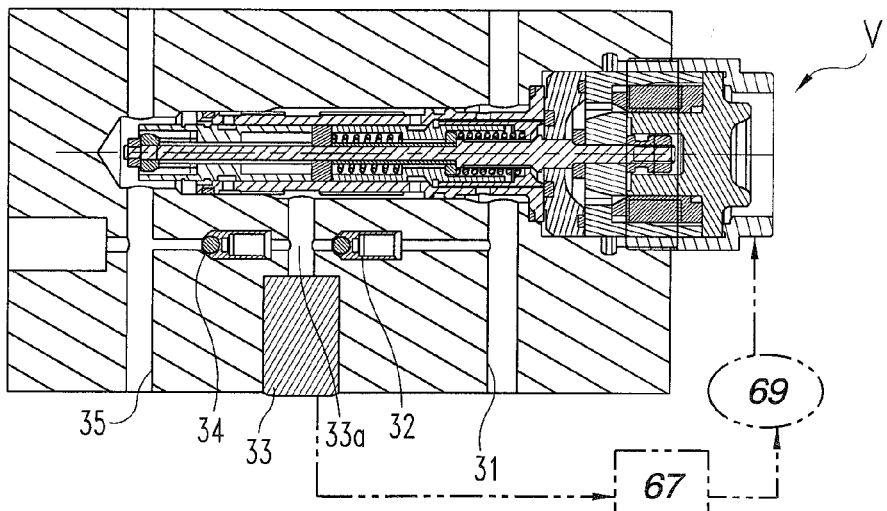

Outside the inlet valve seat 13a (FIG. 1c) and the drain valve seat 13b (FIG. 1d) are two cavities 21, 22, respectively, defined within the valve housing 13. The inlet cavity 21 is in fluid communication with a high pressure feed rail 31 (FIG. 2) though feed ports 18. The drain cavity 22 is in fluid communication with a drain rail 35 (FIG. 2). The ports 18, 19 and 20 may be preferably uniformly disposed around the circumference of the valve body, surrounded by the corresponding rail 31, 33a, and 35.

In the illustrated embodiment, the floating sleeve 6, inlet spring 7, stroke limiting shim 8 (FIG. 1d) on which the spring 7 acts, inlet spacer 11 that bears on a gap shim 12 to maintain spacing between the inlet and drain valves, the inlet valve 9, the middle spring 10, the drain spacer 14 and drain valve 15, and the drain spring 16, are all preferably assembled on one side of the stroke limiting shoulder 17a of the valve shaft 17 (FIG. 1b). On the other side of this shoulder 17a are the stator spacer 4, the stator 3, armature spacer 25 and armature 2.

The inlet valve 9 and drain valve 15 are slidably disposed within the valve housing 13 and about the inlet and drain spacers 11, 14, respectively. The stroke limiting shim 8 can also slide on the inlet spacer 11, but is limited to movement together with the inlet valve 9 due to the inlet spring 7. The armature 2, armature spacer 25, inlet spacer 11, gap shim 12 and drain spacer 14 are all preferably fixed or attached to the valve shaft 17, such as by nut and bolt arrangement at the ends of the valve shaft 17.

The annulus 23 of the inlet valve 9 is in fluid communication with the activating plunger 33 (FIG. 2) though the outlet ports 19 and outlet rail 33a. The outlet ports are preferably in fluid communication with the drain ports 20 though flutes 26 (FIG. 1e) located on the external surface of the valve housing 13. A clamping nut 1 is used to clamp the entire valve cartridge within the housing of the external rails 31, 33a, 35, as depicted in FIG. 2. This external housing can also contain a high pressure check valve 32 between the feed rail 31 and the outlet rail 33a and a drain check valve 34 between the drain rail 35 and the outlet rail 33a.

Another embodiment of the present invention is in the form of a valve similar to that of FIGS. 1 and 2 but further including motion sensors for each engine valve. This embodiment is shown in phantom in FIG. 2. Motion sensors 67 (shown in phantom) may be connected to a controlling computer 69 (shown in phantom) to provide immediate feedback to the controlling computer 69 with respect to movement of the valve. The motion sensors 67 may permit accounting for changes in valve response due to a variety of factors including variable viscosity that may be the result of the temperature change. The motion sensors 67 may be any sensor capable of providing signals to the computer 69. Such sensors may be for example a proximity or Hall effect sensor that generates a pulse whenever the sensor comes in close proximity to an object. Other sensors, for example, incremental optical encoders and laser interferometers, may also be used.

Figure 3:
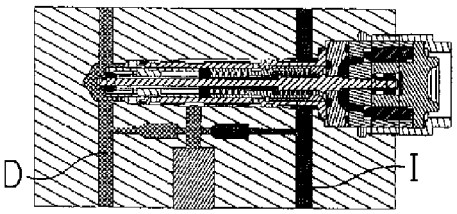
FIG. 3 includes a series of cross-sectional schematic views of the fluid flow through the valve of FIG. 1 at different stages of operation of the valve.
Figure 3:
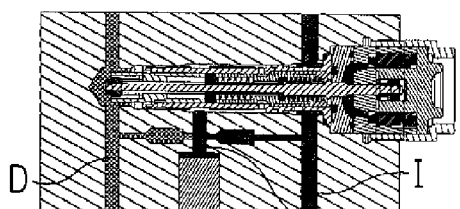
Figure 3:
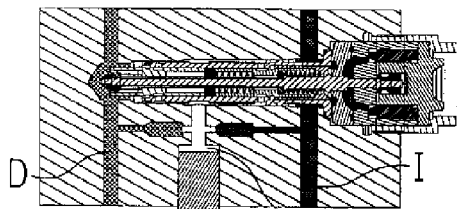
Figure 3:
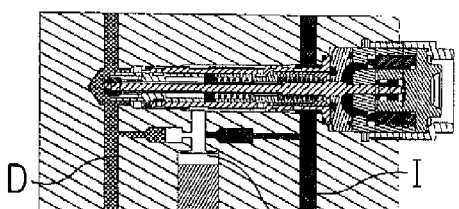
Figure 3:
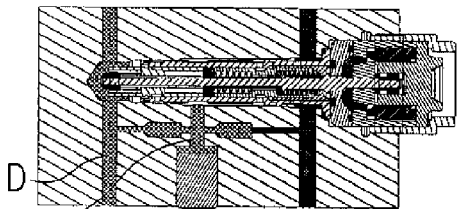
Figure 3:
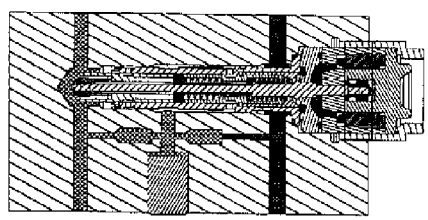
Figure 3:
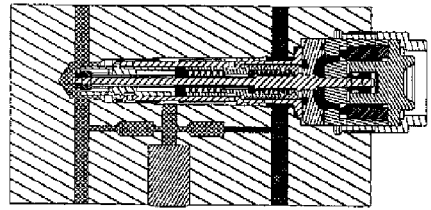
Figure 3:
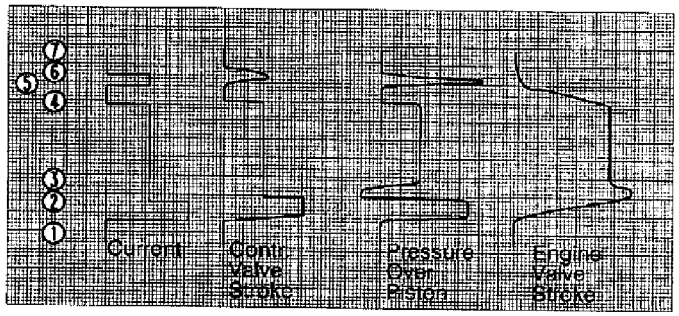

The manner of operation of the valve V of FIGS. 1-2 is depicted in the sequential views of FIG. 3. In the illustrated embodiment, the valve V controls engine intake and/or exhaust valve(s) though the activating plunger 33. When the solenoid 3 is de-energized, the inlet spring 7 holds the inlet valve 9 on the inlet seat 13a, sealing the high pressure feed I from the activating plunger 33. At the same time, the middle spring 10 forces the valve shaft 17 away from the solenoid stator 3 until it reaches the stroke limiting shim 8. It can be appreciated that the thickness of the shim can be adjusted to vary the stroke of the valve shaft. At this point, the drain valve 15 is pushed against the gap shim 12 by the drain spring 16, which results in the drain valve sealing surface 15a moving away from the drain seat 13b. This action thus connects the activating plunger 33 to the drain rail 35 though the drain cavity 22 and drain port 20 to let the plunger 33, and ultimately the engine valve, move to and stay in the closed position.

When the solenoid stator 3 is energized at a high level current, the armature 2 pulls the valve shaft 17 against the pre-load of the middle spring 10, as depicted at Step 2 in FIG. 3. As the valve shaft translates, the drain valve sealing surface 15a contacts the seat 13b. At the high level current, the solenoid is capable of overcoming the pre-load of the drain spring 16 and middle spring 10, so the shaft continues to translate, compressing the drain spring 16 and providing sufficient sealing force towards the drain cavity 22. The gap between the end surfaces of the inlet valve 9 and the drain valve 15 is greater than the thickness of the gap shim 12. Thus, when both valves are seated further motion of the valve shaft 17 initially compresses the middle spring 10 until the gap shim 12 contacts the end of the inlet valve 9. The small air gap (Dimension "a"+Dimension "b") between the stator 3 and armature 2 allows the magnetic force in the solenoid to increase to a higher level sufficient so that the valve shaft 17 will force the inlet valve 9 from its seat 13a against the force of the inlet spring 7. Apart from possible inertia forces produced by the acceleration and deceleration of the valve components, the magnetic force of the solenoid is working against the combined force of the inlet spring 7 and drain spring 17. Movement of valve shaft 17 is limited when the stroke limiting shoulder 17a contacts the solenoid spacer 4.

During the time that the inlet valve 9 is open, the high pressure inlet fluid I can flow from the feed rail 31 to the activating plunger 33. When the activating plunger is part of an engine valve system, the plunger generates hydraulic force to open the engine valve against the biasing force tending to keep that valve closed. Typically, the maximum stroke of the activating plunger 33 is mechanically and hydraulically limited. Apart from this maximum stroke limit, other parameters such as pressure, temperature, media viscosity, fluid volume, flow areas, plunger diameter and the like—the time that the inlet valve 9 is open determines the stroke of the activating plunger 33, and ultimately the stroke of the engine valve driven by the plunger.

When the desired open time of the inlet valve 9 (and ultimately the engine valve stroke) has been reached, the current in the solenoid is dropped to a medium level, as depicted in Steps 3-4 of FIG. 3. At this level, the magnetic force generated by the solenoid is no longer enough to hold the inlet valve 9 in the open position (Step 2) against the combined force of the springs 7 and 16. Thus, the valve shaft 17 moves back until the inlet valve 9 is seated. At this point, the spring force of the inlet spring 7 is taken up by the seat 13a to that the inlet spring is no longer working against the solenoid magnetic force. The decreased magnetic force is still greater than the force of the drain spring 16 and middle spring 10, so the valve shaft 17 will stay in the middle position, causing both valves 9 and 15 to stay closed. (Step 3 in FIG. 3). In this position, the fluid N is trapped over the activating plunger 33 with less than feed pressure, which for an engine will cause the engine valve to stay in its open position. The thickness of the gap shim 12 is smaller than the distance between the ends of the seated inlet and drain valves 9 and 15 to give some free play.

The characteristics of the solenoid magnetic force are necessarily shaped in relation to the spring forces it must work against. Using an energy efficient solenoid, the magnetic force vs. the armature motion from the initial maximum air gap is too progressive. In order to be able to release the armature from the minimum air gap, the holding current would normally be dropped significantly. However, the current value that could hold the armature in the middle position still holds the armature at the minimum air gap position. On the other hand, a sufficiently low releasing current at minimum air gap is not enough to hold the armature in position at a greater air gap, such as at the middle position, so the valve shaft 17 may move to an unintended position where the drain valve 15 will be open. To avoid this discrepancy, the armature 2 is conically shaped so that as the armature approaches the stator 3 the air gap Dimension "a" will decrease but the air gap Dimension "b" will increase. The force characteristic will be less progressive or flatter. This flatness depends on the cone angle α and the initial values of the air gap Dimensions "a", "b".

Closing the engine valve is depicted in Steps 5-7 of FIG. 3. In order to close the valve, the solenoid current is dropped to zero—i.e., the solenoid 3 is de-energized. In this case, the middle spring 10 and drain spring 16 both operate to force the valve shaft 17 farther from the stator 3 until the drain valve 15 contacts the gap shim 12. At this point the drain valve 15 leaves the seat 13*b* and moves together with the valve shaft 17, which is still forced to move by the middle spring 10. This motion stops when the shoulder 17*b* of the valve shaft 17 contacts the stroke limiting shim 8 (FIG. 1*f*). At this position, the drain valve 15 has already opened to the drain rail 35, the activating plunger 33 is connected to the drain flow D, and the engine valve is closing.

To avoid unintended forces caused by built-up pressure, all internal cavities are connected to each other and to the drain rail 35. This fluid communication is provided by the flutes 15*b* inside the drain valve 15 (FIG. 1*g*), the flats 12*a* on the gap shim 12, as well as additional flutes, holes and chamfers located where necessary.

When the solenoid current is dropped from the high current level to the medium level, after the inlet valve 9 is closed and the high pressure supply is cut off, the activating plunger 33 and engine valves are still moving due to their own inertia. This generates depression or cavitation in the trapped volume. To avoid this problem, a drain check valve 34 is introduced between the drain rail 35 and the outlet rail 33*a*. This check valve automatically opens when the pressure difference at the check valve is sufficient to overcome the check valve spring, thereby re-filling the activating plunger volume from the drain rail. In order to accomplish this feature, the drain pressure is preferably on the order of 2 MPa.

Another issue is the impact force caused by the high speed at which an activated engine-valve closes onto its seat. If the solenoid 3 is energized at the medium current level right before the engine valve reaches its seat, the media will be trapped again. The inertia of the moving parts will generate high pressure above the activating plunger 33. On the one hand, this high pressure naturally slows down the moving parts. On the other hand, because the pressure is higher than the high pressure system (typically at 25-30 MPa), a high pressure check valve 32 is introduced between the outlet rail 33*a* and the feed rail 31. This check valve allows the activating plunger—by means of the high pressure—to recuperate some part of the kinetic energy of the moving engine valve components.

Figure 4:
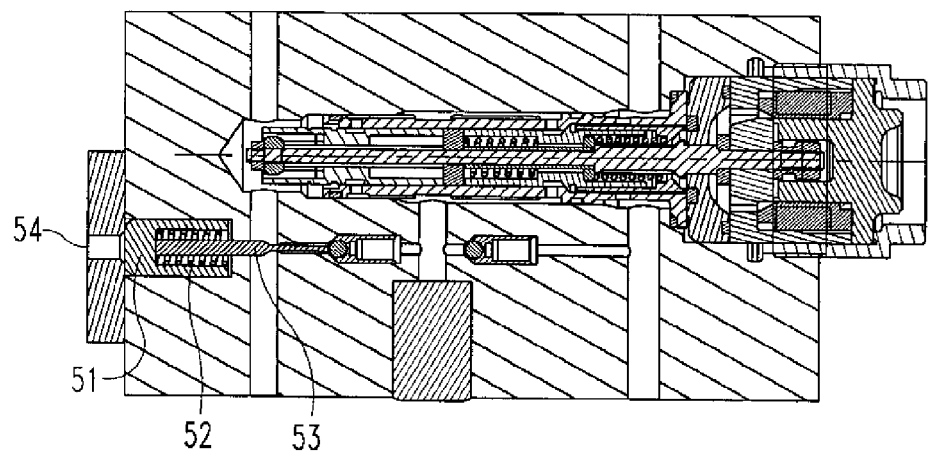
FIG. 4 is a cross-sectional view of the valve of FIG. 1 integrated into a modified head of a hydraulic device similar to that shown in FIG. 2.

One modification of the invention addresses the risk of a faulty valve operation, such as might occur in an engine valve. Thus, as shown in FIG. 4, a plunger 51 is loaded with a spring 52, and a coaxial guided needle 53. In the basic position, the plunger 51 and needle 53 do not exert any force on the drain check valve 34. When a separate three-way valve (not shown) directs pressurized media through the passage 54 to the plunger 51, the plunger 51 pushes the needle 53 which opens the drain check valve 34. Thus, in this condition the high pressure media flows to the drain without forcing the activating plunger 33 to move. The plunger 51 is pressurized during the time that the engine piston is is in proximity to the cylinder head.

Figure 5A:
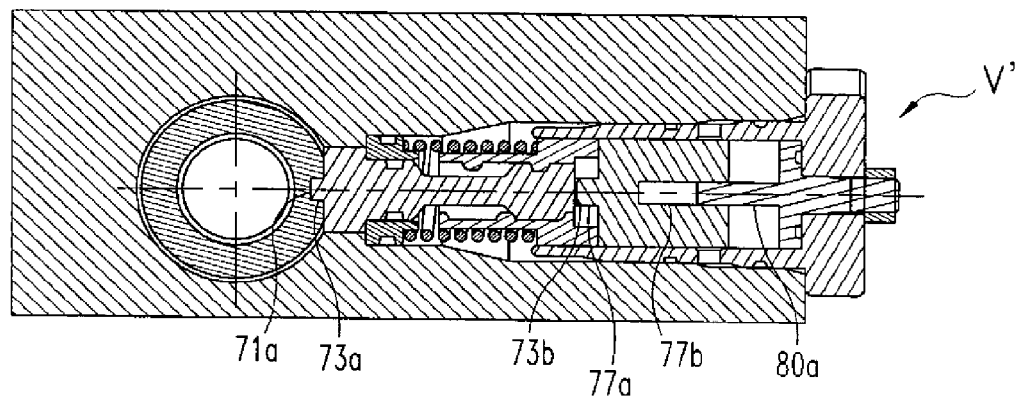
FIGS. 5a and 5b are side and top cross-sectional views of a rotatable spherical ball valve, as an engine intake and/or exhaust valve, controlled by a three-way valve according to another embodiment of the invention.
Figure 5B:
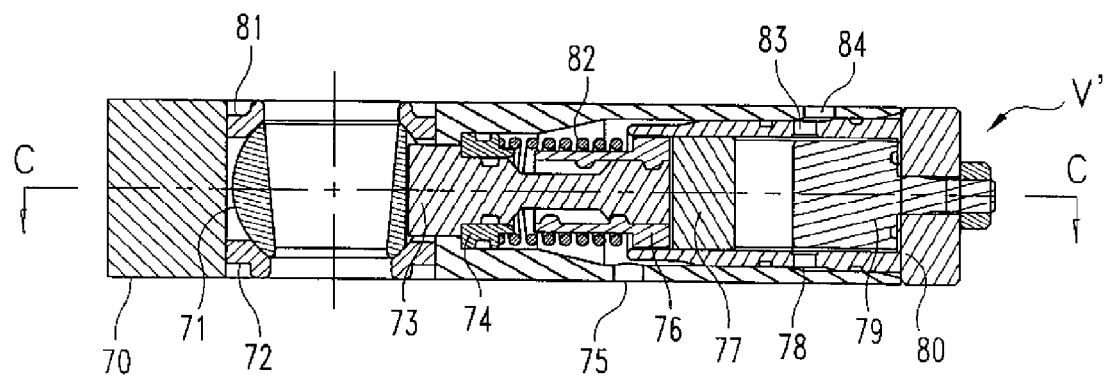

In a further embodiment of the invention, a modified engine valve V', shown in the two views of FIGS. 5*a*, 5*b*, is mounted on the cylinder head 70 of an engine. The modified engine valve V' is controlled by valve V of FIGS. 1 and 2. A ceramic or ceramic-coated spherical ball valve 71 is disposed between a lower seat 72 and an upper seat 81. The ball valve 71 is rotated by a threaded shaft 73, forced to revolve without any axial motion by means of a matching threaded sleeve 76. The sleeve 76 moves axially, but does not rotate. The axial movement of the sleeve 76 is generated in the opening direction by a specially shaped activating plunger 77, in lieu of the plunger 33 in the prior embodiments. A spring 82 or a pneumatic/hydraulic plunger (not shown) works against the plunger 77. A plunger guide 79 is provided within the hydraulic cylinder 80 to restrict any rotation of the activating plunger 77. The position of the plunger guide 79 may be adjusted to obtain the proper flow area for an idle condition.

The restriction of any rotation of both the plunger 77 and the threaded sleeve 76 is carried out with rib-sleeve connections 80*a*-77*b* and 77*a*-73*b* between adjacent parts. The axial motion of the threaded shaft 73 is stopped by the ball valve 71 and the spring retainer 74. The shaft 73 rotates the ball valve 71 through the connection 71*a*-73*a*. To obtain proper sealing force against the peak cylinder pressure, the upper seat 81 is compressed mechanically, hydraulically, electrically or pneumatically (not shown). The pressurized media, controlled by a valve V', is fed to the plunger 77 through the feed ports 83 and 84. The leakage, after lubricating the shaft 73 and the sleeve 76, drains back to the cylinder block through a hole 75. The ball valve of this embodiment provides better hydraulic/geometric flow area ratio and less wet wall area than prior valve systems. Using a bar instead of a ball may increase flow area but may also produce flow sealing problems.

To get proper sealing force against the peak cylinder pressure, the upper seat 81 is to be pressed down mechanically, hydraulically, electrically or pneumatically (these are not shown in the figure). In order, to achieve smaller size (or lower operating pressure), less energy consumption, less wear and shorter response time, electric (e.g. with piezo crystal) or hydraulic load is desirable. In this case during moving the ball valve 71, the down force can be minimized.

Figure 6A:
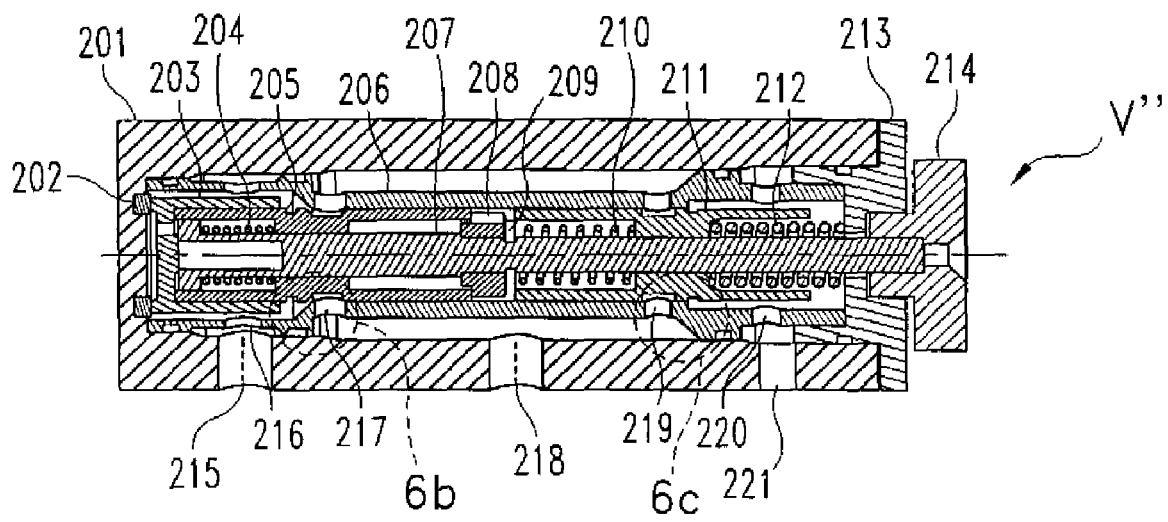
FIGS. 6a-6c are longitudinal and enlarged cross-sectional views along the longitudinal axis of a three-way valve configured for use for controlling ABS systems according to another embodiment of the invention.
Figure 6B:
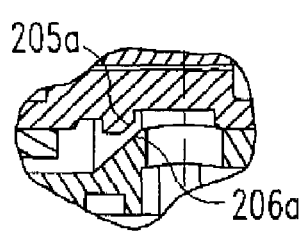
Figure 6C:
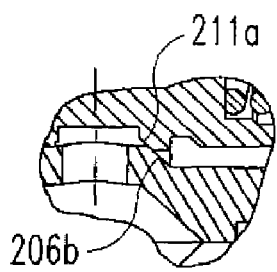

According to yet another embodiment of the invention and referring now to FIGS. 6*a*-6*c*, a three-way valve V" is shown. The valve V" is a modified version of the valve V of FIGS. 1 and 2. The three-way valve V" may be used on for example an antilock (ABS) brake system. In a brake system on the one hand the force—pressure—is to be controlled, not the stroke, on the other hand there must be a constant hydraulic connection between the master- and the slave cylinder, as a default. For this purpose, in case the solenoid (not shown) is deenergized, the inlet valve 205 is open and the return valve 211 is closed, making possible the fluid-communication from the master cylinder though the inlet 215 of the control block 201; a first set of inlet holes 216 of valve housing 206; between the inlet valve's sealing shoulder 205a and its seat 206a in the valve housing 206; the outlet holes 217 of valve housing 206; and the outlet 218 of control block 201 to the slave cylinder. When the wheel-deceleration exceeds the limit, the solenoid (not shown) is energized on medium level and by means of the armature 214 pulls the valve shaft 207, until the middle stop 208 contacts the return valve 211, which stops the motion, based on the—higher than magnetic force—preload of the return spring 212. During this motion, first the inlet valve 205 moves with the valve shaft 207, until its sealing shoulder 205a contacts the inlet seat 206a. The closed inlet disconnects the slave cylinder from the master cylinder. The further motion till the stop is achieved by means of the gap between the middle stop 208 and the return valve 211.

At this short stroke the valve shaft 207 moves relative to the inlet valve 205 compressing the inlet spring 204 and middle spring 210. In case the wheel deceleration is still higher than the limit, the solenoid is energized on the high level, when the magnetic force overcomes the sum of the preload of the return spring 212 and inlet spring 204. Thus the return valve's sealing shoulder 211a leaves its seat 206b in the valve housing 206 and the fluid will be able to flow through the a second set of inlet holes 219 of valve housing 206; the return holes 220 of valve housing 206; and the return outlet 221 of control block 201 to the returning pump, which delivers the fluid back to the brake system.

Both the inlet valve 205 and return valve 211 are pressure balanced in open and closed position, as this was explained earlier. The pressure balance of the inlet valve 205 is independent of the side of the seat that the pressure is acting on, because the inlet valve 205 is moving in a floating sleeve 203, which rests on an elastic gasket 202, similar to the previous example. Extra sealing force can be obtained from additional spring, placed either inside the valve shaft 207 at the inlet end, or—using different geometry—between the valve housing 206 and the floating sleeve 203. The whole unit is retained in the control block 201 by the retainer 213 and the middle stop 208 is held in position by the retaining ring 209. The maximum opening is determined by the floating sleeve/valve shaft contact 203/207 and the other extreme—at max energy level—is determined by the return valve/retainer contact 211/213.

Figure 7:
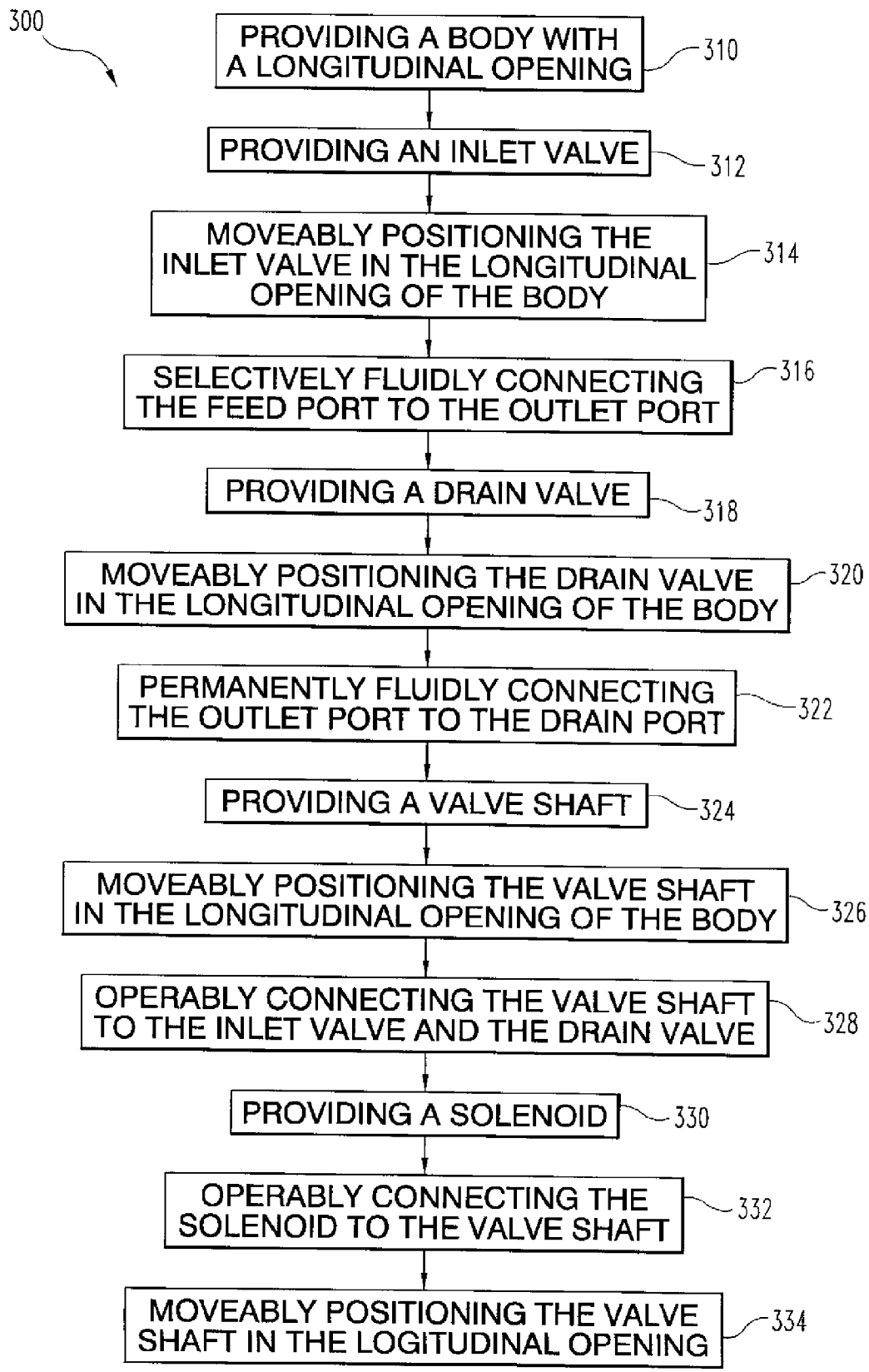
FIG. 7 is a flowchart detailing the basic steps of the valve according the present invention.

According to the present invention and referring now to FIG. 7, another embodiment of the present invention is shown as a method 300 for controlling the motion of a valve in an internal combustion engine is provided. The method includes the steps 310 and 312 of providing a housing with a longitudinal opening and providing an inlet valve. The method also includes the steps 314 and 316 of moveably positioning the inlet valve in the longitudinal opening of the housing and selectively fluidly connecting the feed port to the outlet port. The method further includes the steps 318 and 320 of providing a drain valve and moveably positioning the drain valve in the longitudinal opening of the housing. The method includes the steps 322 and 324 of permanently fluidly connecting the outlet port to the drain port and providing a valve shaft. The method includes the steps 326 328 and 330 of moveably positioning the valve shaft in the longitudinal opening of the housing, operably connecting the valve shaft to the inlet valve and the drain valve and providing a solenoid. The method also includes the steps 332 and 334 of operably connecting the solenoid to the valve shaft and moveably positioning the valve shaft in the longitudinal opening.

Variations and modifications of the present invention are possible, given the above description. However, all variations and modifications which are obvious to those skilled in the art to which the present invention pertains are considered to be within the scope of the protection granted by this Letters Patent.

What is claimed is:

1. A switching control valve assembly for use in controlling the motion of a hydraulic component, said valve assembly comprising:
    a housing defining a feed port, an outlet port and a drain port, said housing defining a longitudinal opening therein;
    an inlet valve moveably positionable in the longitudinal opening of said housing for selectively fluidly connecting the feed port to the outlet port;
    a drain valve moveably positionable in the longitudinal opening of said housing for selectively fluidly connecting the outlet port to a drain cavity outside said housing though the drain port;
    a valve shaft moveably positionable in the longitudinal opening of said housing and operably connected to said inlet valve and said drain valve; and
    a solenoid operably connected to the valve shaft for moveably positioning said valve shaft in the longitudinal opening along the external surface of the housing,
    wherein the housing is configured to provide permanent fluid communication between the outlet port and the drain port,
    wherein said inlet valve includes a first pressure balanced poppet valve, and said drain valve includes a second pressure balanced poppet valve.

2. The switching control valve assembly of claim 1, further comprising an activating plunger fluidly connected to the outlet port, said activating plunger operable to control a separate component.

3. The switching control valve assembly of claim 1, wherein:
    the longitudinal opening of said housing defines a cylindrical bore; and
    said inlet valve and said drain valve are slidably positionable in the bore.

4. The switching control valve assembly of claim 1, wherein said solenoid includes a conically shaped armature.

5. The switching control valve assembly of claim 1, wherein the permanent fluid communication includes longitudinal flutes defined on the exterior of said housing between said outlet port and said drain port.

6. The switching control valve assembly of claim 1, further comprising:
    a floating sleeve disposed between said inlet port and said inlet valve; and
    a biasing spring disposed between said floating sleeve and said inlet valve,
    wherein said inlet valve is operably connected to said valve shaft though said biasing spring and floating sleeve.

7. The switching control valve assembly of claim 1, further comprising a spherical ball valve in fluid communication with the outlet port.

8. The switching control valve assembly of claim 7, wherein said spherical ball valve is an engine valve within an engine.

9. The switching control valve assembly of claim 1, wherein:
   the drain cavity is in fluid communication with a drain rail though said longitudinal opening;
   the outlet port is in fluid communication with a separate outlet rail;
   the inlet port is in fluid communication with a separate inlet rail; and
   said assembly further comprises a first check valve in communication between said drain rail and said outlet rail and configured to only permit flow from said drain rail to said outlet rail.

10. The switching control valve assembly of claim 9, further comprising a second check valve in communication between said outlet rail and said feed rail and configured to only permit flow from said outlet rail to said feed rail.

11. The switching control valve assembly of claim 1, wherein said solenoid comprises a member with three distinct positions, each of the three positions corresponding to a unique current level.

12. The switching control valve assembly of claim 11, wherein the unique current levels include a no current level, a low current level, and a high current level.

13. The switching control valve assembly of claim 12, wherein when said valve shaft is at one of the three distinct positions the valve shaft positions the inlet valve so that the feed port is closed to said outlet port and positions the drain valve so that the drain port is open to the drain cavity.

14. The switching control valve assembly of claim 12, wherein said one of the three distinct positions of the valve shaft corresponds to said no current level at said solenoid.

15. The switching control valve assembly of claim 12, wherein:
   when said valve shaft is at a third of the three distinct positions the valve shaft positions said inlet valve so that the feed port is open to the said outlet port and positions said drain valve so that the drain port is closed to the drain cavity; and
   said third of the three distinct positions corresponds to said high current level at said solenoid.

16. The switching control valve assembly of claim 12, wherein:
   when said valve shaft is at a second of the three distinct positions the valve shaft positions said inlet valve so that the feed port is closed to said outlet port and positions said drain valve so that the drain port is closed to the drain cavity; and
   said second of the three distinct positions corresponds to said low current level at said solenoid.

* * * * *